(12) United States Patent
Okagawa (10) Patent No.: US 8,498,304 B2
(45) Date of Patent: Jul. 30, 2013

(54) COMMUNICATION CONTROLLER (75) Inventor: Hiroshi Okagawa, Kanagawa (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 588 days.

(21) Appl. No.: 12/721,994

(22) Filed: Mar. 11, 2010

(65) Prior Publication Data

US 2011/0149988 A1 Jun. 23, 2011

(30) Foreign Application Priority Data

Dec. 18, 2009 (JP) .................................. 2009-287646

(51) Int. Cl.
*H04L 12/56* (2006.01)
*H04L 29/02* (2006.01)

(52) U.S. Cl.
USPC .......................................... 370/412; 370/278

(58) Field of Classification Search
None
See application file for complete search history.

(56) References Cited

U.S. PATENT DOCUMENTS

| 5,991,298 A * | 11/1999 | Hunt et al. | 370/390 |
| 2008/0077741 A1 * | 3/2008 | Yasui et al. | 711/129 |

FOREIGN PATENT DOCUMENTS

| JP | 2005-130366 | 5/2005 |
| JP | 2009-124488 | 6/2009 |

OTHER PUBLICATIONS

Office Action dated May 7, 2013 for related Japanese Patent Application No. 2009-287646 and its English summary provided by the clients.

* cited by examiner

*Primary Examiner* — Marsha D Banks Harold
*Assistant Examiner* — Matthew Campbell
(74) *Attorney, Agent, or Firm* — Ladas & Parry LLP (57) ABSTRACT

A switch includes: a packet buffer including a plurality of segments for temporarily storing a packet to be relayed, using a segment of a fixed size as a unit of management of a storage area; an input processor configured to receive a packet to be relayed from an external source, refer to an offset, indicating a location in a segment where a free area starts, store a first packet, starting at the location in the segment indicated by the offset, update the location of start indicated by the offset in accordance with the packet size, and store a second packet, starting at the location of start in the segment thus updated; and an output processor configured to read the first and second packets and send the packets to a communication node.

5 Claims, 11 Drawing Sheets

FREE AREA INFORMATION STORAGE 36

COMMUNICATION CONTROLLER

CROSS-REFERENCE TO RELATED APPLICATIONS

This application claims priority to Japan Application No. 2009-287646 filed on Dec. 18, 2009, the disclosure of which is incorporated herein by reference.

BACKGROUND OF THE INVENTION

1. Field of the Invention

The present invention relates to data communication technologies and, more particularly, to a communication control technology for relaying communication packets.

2. Description of the Related Art

Recently, high-speed Internet services and IP (Internet protocol) phone services have become widely available. Associated with this, high-speed transmission of communication packets (hereinafter, simply referred to as packets) like Ethernet packets ("Ethernet" is a registered trademark) and IP packets is called for. This requires increase in the speed of relaying packets in a communication controller such as a Layer 2 switch, a Layer 3 switch, or a router.

A communication controller is provided with a memory (hereinafter, also referred to as "packet buffer") for storing packet data temporarily. Generally, packet data is of a variable size. However, management of variable-length storage areas in a communication controller will result in complicated processes. To address this, a packet buffer is divided into units of management (hereinafter, referred to as "segment") of a fixed size. A packet is assigned to one or more segments. A segment is configured to store data derived from a single packet.

[patent document No. 1] JP 2005-130366

As the speed and capacity of communication controllers are increased, the capacity of packet buffers is increased so that the size of data that can be stored in a segment is increased. The inventor has become aware of a problem in that the scheme of configuring a single segment to store data derived from a single packet leaves large unused areas in the segments.

SUMMARY OF THE INVENTION

The present invention addresses the drawback and a purpose thereof is to provide a technology of using a memory provided in a communication controller efficiently.

To address the above-mentioned goal, the communication controller according to one embodiment of the present invention comprises: a memory including a plurality of segments for temporarily storing a packet to be relayed, using a segment of a fixed size as a unit of management of a storage area; a packet acknowledging unit configured to receive a packet to be relayed from an external source; a packet writing unit configured to refer to an offset, indicating a location in a segment where a free area starts, store a packet, starting at the location in the segment indicated by the offset, update the location of start indicated by the offset in accordance with the packet size, and store another packet, starting at the location of start in the segment thus updated; and a packet sending unit configured to read the packet, starting at the location of start, read said other packet, starting at the updated location of start, and send the packets outside the communication controller.

The communication controller may be a switch that temporarily buffers a communication packet acknowledged from an external communication node and relays the packet to another communication node. For example, the communication controller may be a Layer 2 switch, a Layer 3 switch, a bridge, or a router. A segment may be a unit of assignment of a storage area in a memory to a process of buffering a packet or a unit of releasing the assignment. According to this embodiment, the size of a free area in a segment is reduced and the memory is used efficiently by storing data for multiple packets in a single segment.

When the free capacity of a segment specified the offset exceeds the packet size, the packet writing unit may store the excess packet data in another segment and updates the location of start indicated by the offset to a location in said other segment where a free area that remains starts.

Said other segment may be the segment given the highest priority to store a packet in a table that stores information on segments configured as free areas. Alternatively, said other segment may be a segment next to the segment indicated by the offset in the order of storage. According to this embodiment, when the free capacity in a segment is less than the packet size, the packet data defined by the free capacity is stored in that segment. The remaining data is stored in another segment. In this way, the entirety of the packet storage area in a segment can be used efficiently so that the memory is used efficiently.

The communication controller may further comprise: a read count storage configured to store, in association with each of the plurality of segments, a total number of times that each packet stored in the respective segments should be read; and a segment releasing unit. When the packet writing unit stores the packet acknowledged by the packet acknowledging unit in a segment, the packet writing unit may increase the total associated with the segment, the packet sending unit may decrease the total associated with the segment when the packet sending unit reads the packet stored in the segment, and the segment releasing unit may configure a segment for which the read count reaches 0 as a new free area.

Configuration of a segment as a new free area may be achieved by adding the information on the segment for which the total reaches 0 to the table that stores information on segments configured as free areas. Alternatively, the storage area in the memory assigned as a segment may be released as appropriate. According to this embodiment, when the plurality of packets stored in a segment have been read, i.e., when the data stored in the segment is referred to for the last time, the segment is configured as a free area to store a new packet. In this way, the packet stored in a segment is protected and yet the re-use of the segment is achieved.

The packet writing unit may store a packet that should be sent via a plurality of output ports in a segment such that the packet writing unit increases the total associated with the segment by the number of output ports that the packet should be sent to, and the packet sending unit may send the packet from any of the plurality of output ports such that the packet sending unit reads the packet from the segment and successively decreases the total associated with the segment.

According to this embodiment, a multicast packet or a broadcast packet to be relayed remains stored until the packet has been sent to a plurality of output ports. Further, the segment including the packet is allowed to be re-used appropriately.

The communication controller may further comprise: a free segment information storage configured to store information on a segment configured as a free area; and a head pointer indicating information on a segment, of those segments configured as free areas, that should store a packet, and an end pointer indicating a location that should store information on a segment newly configured as a free area. The packet writing unit may store the packet in the segment identified by the head pointer, and the segment releasing unit may store the information on the segment newly configured as a free area at the location indicated by the end pointer, and, when that segment is also identified by the head pointer, update the head pointer to indicate information on another segment.

According to this embodiment, duplicate management of the same segment in the segment information storage is prevented. When duplicated management occurs, even when a packet is stored in a segment identified by the entry indicated by the head pointer so that the segment is no longer a free area, another entry related to the segment may maintain information indicating the segment as comprising a free area. As a result, a problem may occur (e.g., the segment is overwritten by a packet yet to be read). The aforementioned embodiment avoids the problem and achieves rigorous segment management.

Optional combinations of the aforementioned constituting elements, and implementations of the invention in the form of apparatuses, methods, systems, programs, and recording mediums storing programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A summary of the present invention will be given before describing the structure according to the embodiment. In a communication control device like a switch, packet data (hereinafter, also simply referred to as "packet") may be temporarily stored in a segment of a fixed size in a packet buffer in order to increase the reliability of packet transmission. In the related art, a packet longer than a segment size is divided and stored in multiple segments accordingly. The data stored in a single segment is derived from a single packet.

For example, when a 64-byte packet is stored in a segment for which 512 bytes are permanently secured, a little less than 90% of the segment capacity remains unused. In other words, a packet actually occupies a part of the capacity of the packet buffer so that the memory may be used inefficiently. In particularly, in the current age when packet buffers have a large capacity, the scheme of configuring a single segment to store data derived from only a single packet leaves large unused areas in the segments.

This is addressed in this embodiment by managing an offset that indicates the start of a free area in a segment so that a packet is stored, starting at the location indicated by the offset. This allows storing multiple packets in a single segment so that the memory is used efficiently by using the segment capacity efficiently.

Figure 1:
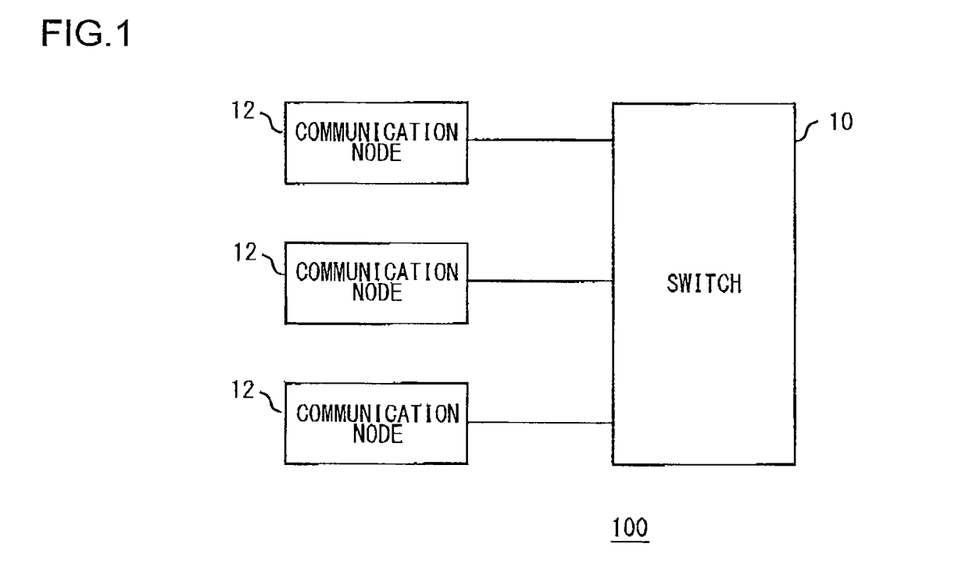
FIG. 1 shows the structure of a communication system according to the embodiment.

FIG. 1 shows the structure of a communication system according to the embodiment. A communication system 100 includes a switch 10 and multiple communication nodes 12. The switch 10 is a communication controller that relays Layer 2 packets or Layer 3 packets transmitted from a given communication node 12 to another communication node 12 in accordance with a destination address set in the packet.

The communication node 12 is an information processor that transmits and receives packets to and from another communication node 12 via the switch 10. For example, the node 12 may be a PC or a switch different from the switch 10. In other words, the communication system 100 is configured such that the communication nodes 12 installed in a communication network (LAN, WAN, Internet, etc.) are connected to each other via the switch 10.

Figure 2:
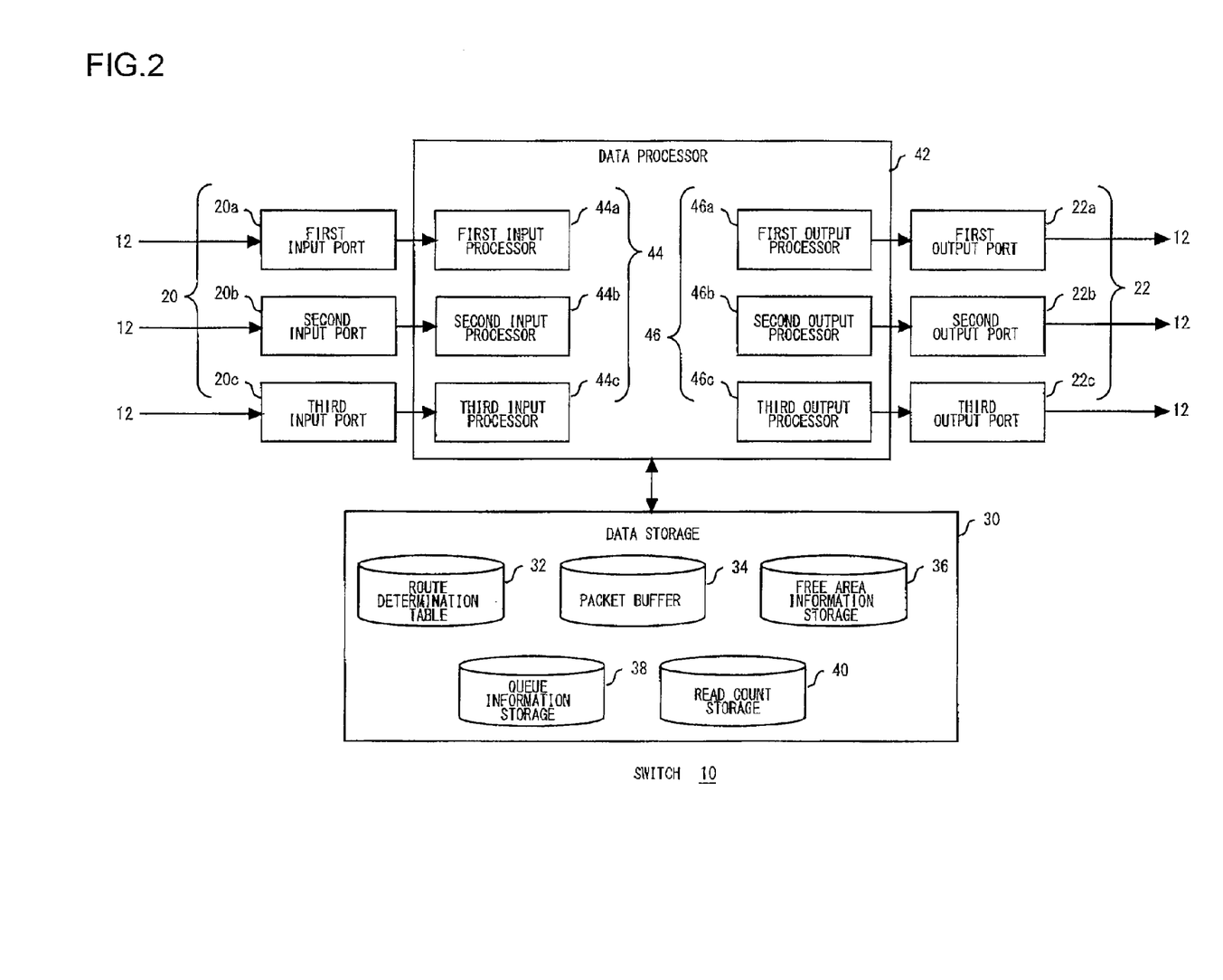
FIG. 2 is a block diagram showing the functional configuration of the switch of FIG. 1.

FIG. 2 is a block diagram showing the functional configuration of the switch 10 of FIG. 1. The switch 10 comprises a first input port 20*a*, a second input port 20*b*, a third input port 20*c*, which are generically referred to as input ports 20, a first output port 22*a*, a second output port 22*b*, a third output port 22*c*, which are generically referred to as output ports 22, a data storage 30, and a data processor 42. For convenience sake, three input ports 20 and three output ports 22 are illustrated. However, the number of ports is not limited specifically.

The blocks in the block diagram of this specification are implemented, in hardware, by devices and machines represented by a CPU of a computer and a memory, and, in software, by a computer program or the like. FIG. 2 depicts functional blocks implemented by the cooperation of hardware and software. Therefore, it will be obvious to those skilled in the art that the functional blocks may be implemented in a variety of manners by combinations of hardware and software.

For example, the input ports 20 and the output ports 22 of FIG. 2 may be connection ports connected to a communication cable from the communication node 12. The function of the data storage 30 may be implemented in a memory. The function of the data processor 42 may be implemented by a program, stored in the memory of the switch 10, and executed by a CPU. Alternatively, the function may be implemented by an electronic circuit such as an LSI.

The input port 12 receives a packet transmitted from the communication node 12 and sends the packet to the data processor 42. The output port 22 transmits the packet sent from the data processor 42 to the communication node 12.

The data storage 30 is a storage area adapted to store various data. The data storage 30 includes a route determination table 32, a packet buffer 34, a free area information storage 36, a queue information storage 38, a read count storage 40.

The route determination table 32 stores a destination address set in a packet transmitted from the communication node 12 (e.g., MAC address or IP address) in association with the output port 22 that the packet should be directed to. The route determination table 32 may be a MAC address table in a Layer 2 switch or a routing table in a Layer 3 switch or a router.

The packet buffer 34 stores data for one or more packets in each of multiple segments, using a segment of a fixed size as a unit of storage area management. In this embodiment, each segment is assigned an ID (hereinafter, referred to as "segment number") that distinguishes the segment from the other segments. Hereinafter, segments assigned segment numbers 1-N will be referred to as segments #1-#N. It will be assumed that the segment size according to the embodiment is 512 bytes.

Figure 3:
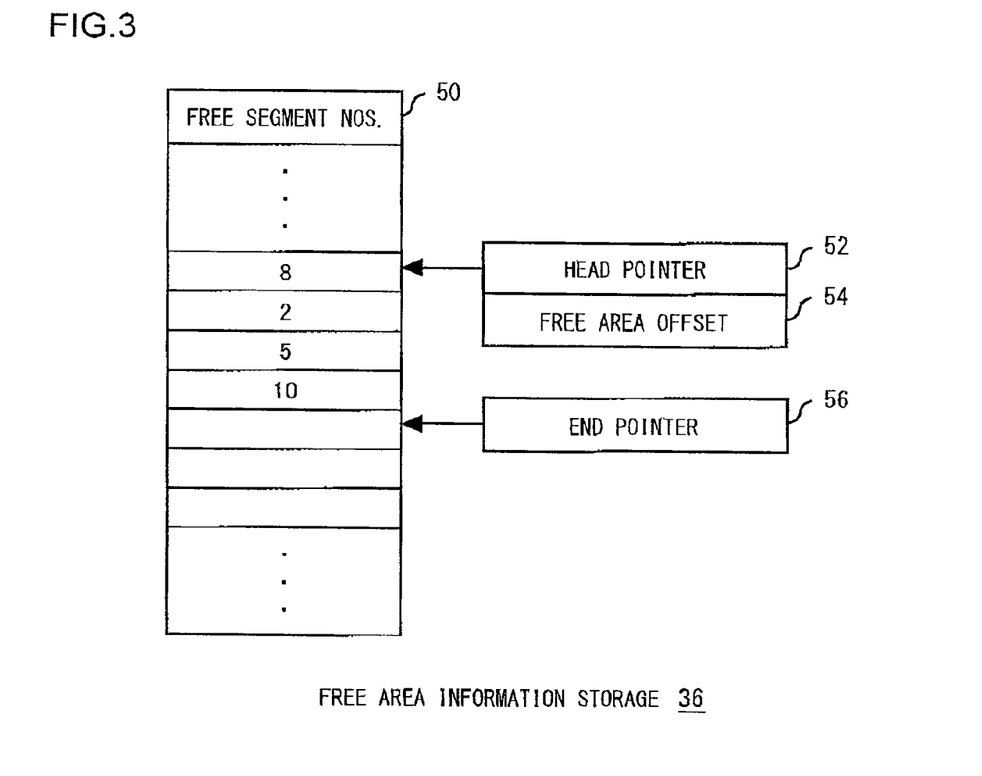
FIG. 3 schematically shows data stored in the free area information storage.

The free area information storage 36 stores information on segments that have free areas (hereinafter, "free segments"). FIG. 3 schematically shows data stored in the free area information storage 36. A free area management table 50 is a storage area adapted to sequentially store segment numbers of segments of designated as free segments. The free segment that should store a packet is indicated by an entry in a head pointer 52. Specifically, the address of the top entry in the free space management table 50 is entered in the pointer 52. The top entry is the earliest segment recorded as an entry in the table 50, of those segments designated as free segments.

A free area offset 54 stores data that indicates a location where a free area starts in the free segment indicated by the head pointer 52. For example, if the value of the free area offset 54 is 100, it means that the area starting at the 100th byte of the free segment is free. An end pointer 56 stores an address that should store the segment number of a segment newly designated as a free segment.

Figure 4:
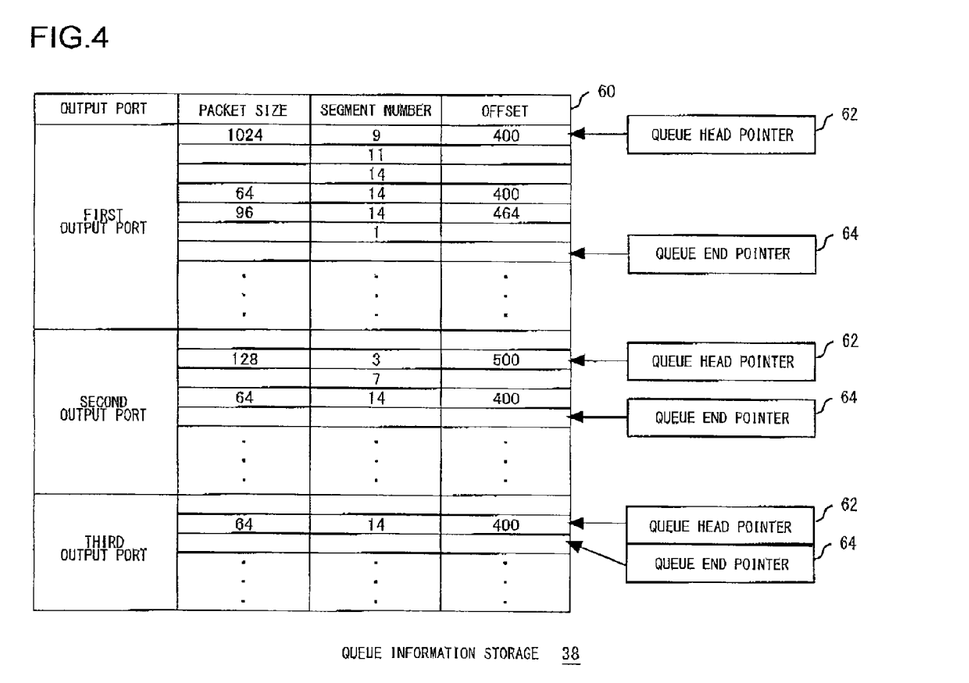
FIG. 4 schematically shows data stored in the queue information storage.

Referring back to FIG. 2, the queue information storage 38 stores information for managing queues corresponding to the respective output ports 22. The information is referred to when each of the output ports 22 sends a packet. FIG. 4 schematically shows data stored in the queue information storage 38. A queue management table 60 stores, for each packet that should be sent from the output port 22, the packet size, the segment number of the segment in which the packet is stored, and the offset value indicating the location in the segment where the storage is started. Hereinafter, the entirety of the entries in the queue management table 60 corresponding to a given output port 22 will be referred to as a queue corresponding to that output port 22.

A queue head pointer 62 of FIG. 4 stores an address of the top entry in the queue corresponding to the output port 22. A queue end pointer 64 stores an address where a new entry in the queue should be added. Basically, an entry in the queue management table 60 is configured such that the packet size, the segment number, and the offset are associated with other for a given packet. When the packet size exceeds the free capacity of a segment, the segment number of the segment that stores the excess is added as a subsequent entry.

For example, the queue of FIG. 4 corresponding to the first output port 22a contains information on three packets. The first packet contains 1024 bytes and is stored in the segment #9, starting at the 400th byte. The packet data in excess of the segment #9 is stored in the segment #11, starting at the beginning of the segment. The packet data in excess of the segment #11 is stored in the segment #14, starting at the beginning of the segment. The second packet contains 64 bytes and is stored in the segment #14, starting at the 400th byte. The second packet is a multicast packet. In other words, a similar entry is found in the queue corresponding to the second output port 22b and in the queue corresponding to the third output port 22c, indicating that the second packet should be output from multiple output ports 22.

Referring back to FIG. 2, the read count storage 40 stores, for each of the multiple segments in the packet buffer 34, a total number of times that each of the multiple packets stored in the segments is scheduled to be read. The read count translates into the number of output ports 22 that should send the packet. In the case of a unicast packet, the count is 1. In the case of a multicast packet or broadcast packet, the count is 2 or more. When the read count of a segment is 0, it means that the packet stored in the segment is not read, i.e., the packet stored in the segment may be released or overwritten.

The data processor 42 executes various data processes for relaying packets exchanged between the communication nodes 12. The data processor 42 includes a first input processor 44a, a second input processor 44b, a third input processor 44c, which are generically referred to as input processors 44, a first output processor 46a, a second output processor 46b, and a third output processor 46c, which are generically referred to as output processors 46.

Figure 5:
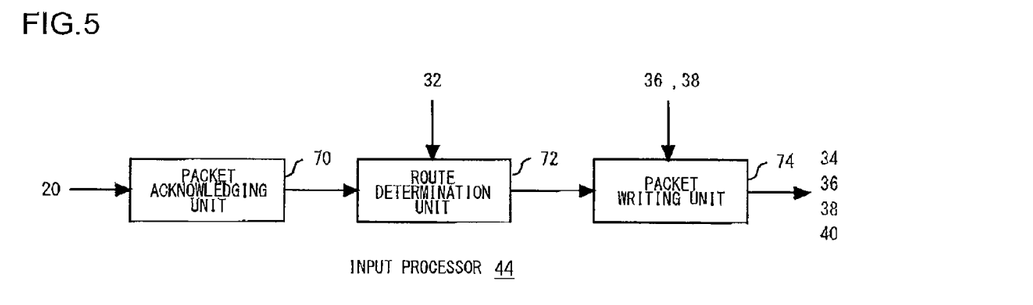
FIG. 5 is a block diagram showing the input processor of FIG. 2 in detail.

Each of the input processors 44 receives a packet from the corresponding input port 20 and stores data related to the packet in the data storage 30. A given input processor 44 is independent of the other input processors 44 so that they operate in parallel. FIG. 5 is a block diagram showing the input processor 44 of FIG. 2 in detail. The input processor 44 includes a packet acknowledging unit 70, a route determination unit 72, and a packet writing unit 74.

The packet acknowledging unit 70 receives a packet transmitted from the communication node 12 via the corresponding input port 20. The route determination unit 72 refers to the route determination table 72 and determines the destination of transfer of the packet in accordance with the destination address designated in the packet acknowledged by the packet acknowledging unit 70. More specifically, the unit 72 determines which of the multiple output ports 22 the packet should be sent to.

The packet writing unit 74 stores the packet for which the destination output port 22 is determined in the data storage 30. A more specific description follows. First, the packet writing unit 74 refers to the free area information storage 36 and determines whether there is a sufficient free area in the packet buffer 34. More specifically, when the address indicated by the head pointer 52 and the address indicated by the end pointer 56 differ, the unit 74 determines that there is a free area. When the addresses match, the unit 74 determines that there is not any free area. Subsequently, the unit 74 calculates the overall capacity of the free area, i.e., (segment size× number of free segments−free area offset 54). When the overall capacity of the free area is equal to or more than the packet size, the unit 74 determines that a free area is available. When the capacity is less than the packet size, the unit 74 determines that a free area is not available.

Subsequently, the packet writing unit 74 refers to the queue information storage 38 and determines whether there is a sufficient free area in the queue management table 60. More specifically, the unit 74 identifies the current data size of the queue corresponding to the output port 22 that the packet should be sent to, by referring to a difference between the address indicated by the queue end pointer 64 and the address indicated by the queue heat pointer 62. When the total of the data size and the data size of an entry to be newly added to the queue is within the predetermined maximum size of the queue, the unit 74 determines that there is a free area. When the total exceeds the maximum size of the queue, the unit 74 determines that a free area is not available.

Since the data size of entries to be newly added to the queue management table 60 is positively correlated to the number of entries to be newly added, the unit 74 may calculate the data size by multiplying a predetermined value indicating the data size of a single entry by the number of entries. The number of entries to be newly added is equal to the number of segments used to store the packet and is calculated according to the expression below (hereinafter, also referred to as "expression 1").

$$(\text{packet size} + \text{value of free area offset } 54)/\text{segment size} + 1$$

Accordingly, in the case that the packet size is 1024 bytes, the value of free area offset 54 is 400, and the segment size is 512 bytes, (number of entries to be newly added to the queue)= (number of segments to store the packet)=3.

When at least one of the packet buffer 34 and the queue management table 60 lacks a sufficient free area, the packet writing unit 74 suspends the process of writing a unicast packet and discards the unicast packet. When the packet buffer 34 has a sufficient free area and the queue management table 60 has a sufficient free area, the packet writing unit 74 continues the process of writing the unicast packet.

When data for a multicast packet or a broadcast packet is to be stored in the data storage 30, a determination as to whether a free area is available is made for each of the multiple queues corresponding to the multiple output ports 22 that the packet should be sent to. When at least one queue is determined to have a free area, the queue is specified as a queue in which an entry is to be added, and the packet writing process is continued.

When the packet writing process is continued, the packet writing unit 74 first calculates the number of segments that should store the packet (hereinafter, also referred to as "write segments") according to the expression 1 above. When the number of write segments is 2 or more, the packet writing unit 74 repeats the following steps until the number of write segments reaches 1.

Step 1: The unit 74 refers to the head pointer 52 in the free area information storage 36 and identifies the write segment. The unit 74 writes the packet in the write segment, starting at the location indicated by the free area offset 54.

Step 2: The unit 74 increases the value of the head pointer 52 (i.e., updates the pointer 52 to indicate the information on the next free segment) and updates the value of the free area offset 54 to 0 (i.e., updates the offset 54 to indicate the start of the free segment).

Step 3: The unit 74 decreases the number of write segments by 1.

When the number of write segments is 1, the value of the free area offset 54 is updated in step 2 to indicate the location that follows the location where the end data of the packet is stored. Meanwhile, the value of the head pointer 52 is not updated.

Subsequently, the packet writing unit 74 updates the data in the queue information storage 38. More specifically, the unit 74 adds a new entry corresponding to the write segment in the queue managed by the queue management table 60 corresponding to the output port 22 that the packet should be sent to, starting at the address designated by the queue end pointer 64. The packet writing unit 74 records in the entry the segment number of the segment in which the packet is written. The packet size and the location where the writing operation is started, i.e., the value of the free area offset 54 occurring when the writing operation is started, are further recorded in the top entry for the packet.

In the case of a multicast packet or a broadcast packet, the packet writing unit 74 adds a new entry only in a queue in which the maximum size is not exceeded as a result of addition of a new entry, i.e., a queue in which an entry is to be added. Of the plurality of output ports 22 that the packet should originally be sent to, this will cause the packet to be sent only from the output port 22 corresponding to the queue in which an entry is to be added.

Ultimately, the packet writing unit 74 updates the data in the read count storage 40. More specifically, for each new entry in the queue, the unit 74 increases the read count of the segment recorded in the entry, i.e., the segment that stored the packet, by one.

For example, when a unicast packet is stored in the segment #1 and the segment #2 and two entries recording the respective segment numbers are added to a single queue, the unit 74 increases the read count of the segment #1 and the read count of the segment #2 by one. When a multicast packet is stored in the segment #1 and the segment #2 and two entries similar as above are added to each of two queues, respectively, the unit 74 increases the read count of the segment #1 and the read count of the segment #2 by two.

Figure 6:
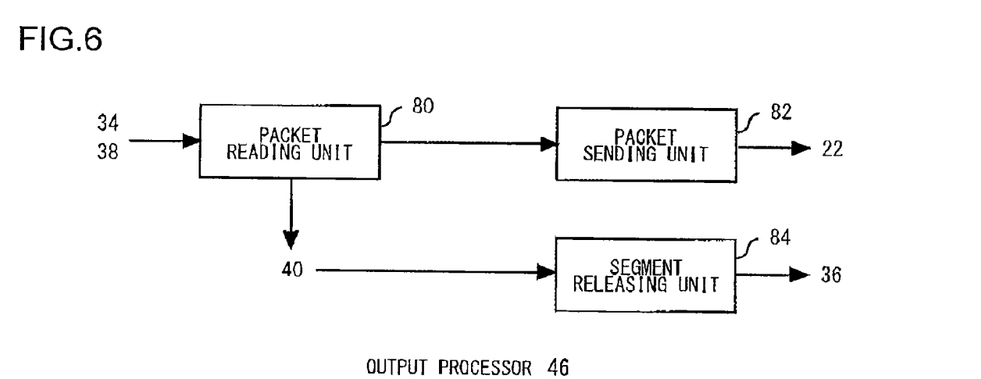
FIG. 6 is a block diagram showing the output processor of FIG. 2 in detail.

Each output processor 46 reads packet related data from the data storage 30 and sends the packet to the corresponding output port 22. A given output processor 46 is independent of the other output processors 46 so that the processors 46 operate in parallel. FIG. 6 is a block diagram showing the output processor 46 of FIG. 2 in detail. The output processor 46 includes a packet reading unit 80, a packet sending unit 82, and a segment releasing unit 84.

The packet reading unit 80 periodically monitors whether there is a change to the address indicated by the queue end pointer 64 in the queue for the corresponding output port 22. If there is a change in the address indicated by the queue end pointer 64, the unit 80 determines that a new entry is added to the monitored queue and identifies the entry indicated by the queue head pointer 62.

The packet reading unit 80 then substitutes the packet size and the offset value in the entry indicated by the queue head pointer 62 into expression 1 above so as to identify the number of entries corresponding to one packet. The unit 80 then refers to each entry so as to read the data for one packet from the segment in the packet buffer 34 corresponding to the segment number indicated in the entry. For example, the unit 80 reads data defined by (segment size−offset value) from the segment corresponding to the top entry, which could be one of the entries corresponding to one packet. When there are multiple entries, data defined by (packet size+offset value−segment size×(number of entries−1)) is read from the segment corresponding to the last entry. From those segments corresponding to entries between the top and end entries are read data defined by the segment size. In other words, the entirety of the segment is read.

When the packet has been read, the packet reading unit 80 updates the location indicated by the head pointer 62 in the queue information storage 38 by the number of entries referred to when the packet was read. Further, the packet reading unit 80 updates the read count storage 40, decreasing the read count of the segments designated in the entries already referred to by one.

The packet sending unit 82 sends the packet read by the reading unit 80 to the communication node 12 via the corresponding output port 22. In case data for a single packet is divided and stored in multiple segments in a distributed manner, the data read from the individual segments are synthesized and the resultant data for one packet is sent to the communication node 12.

The segment releasing unit 84 periodically refers to the read count of the segments retained in the read count storage 40 and identifies a segment for which the read count changes from 1 or more to 0. The segment releasing unit 84 records the segment number of the segment for which the read count has changed to 0 at the location indicated by the end pointer 56 in the free area information storage 36. In addition, the unit 84 increases the address indicated by the end pointer 56 by an increment defined by one entry so as to indicate the location where the segment for which the read count has reached 0 is stored.

When the segment for which the read count has reached 0 is also the segment indicated by the head pointer 52 in the free area information storage 36, the segment indicated by the head pointer 52 is increased by an increment defined by one entry. In other words, the head pointer 52 is updated so that the head pointer 52 in the free area information storage 36 indicates a segment next to the segment for which the read count has reached 0.

Figure 7:
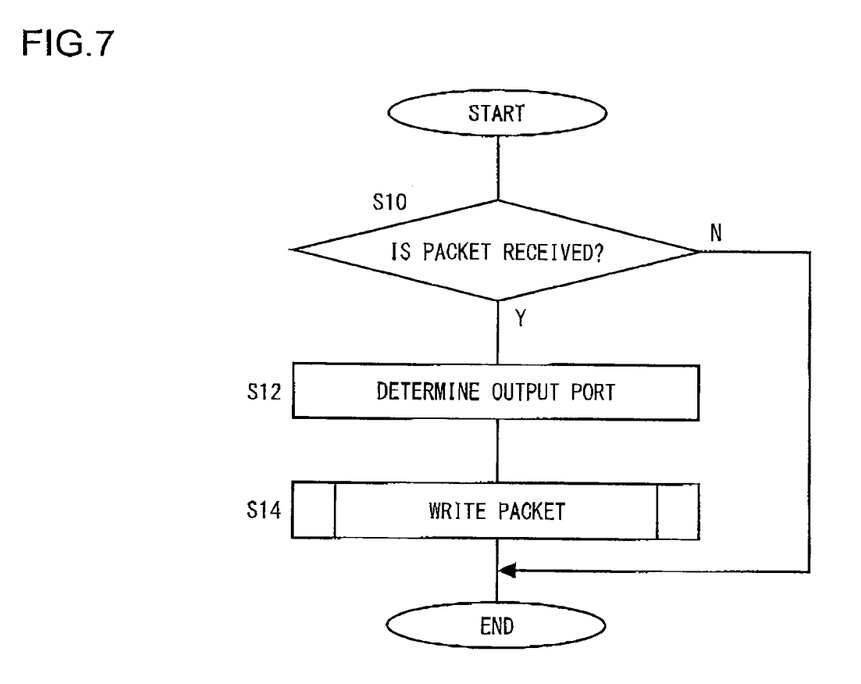
FIG. 7 is a flowchart showing the operation of the switch.

A description will now be given of the operation in the configuration described above. FIG. 7 is a flowchart showing the operation of the switch 10. The figure shows the operation of a single input processor 44. When a packet transmitted from the communication node 12 is acknowledged by the packet acknowledging unit 70 (Y in S10), the route determination unit 72 refers to the route determination table 32 and determines the output port 22 that the packet should be sent to (S12). The packet writing unit 74 performs a packet writing process (S14) described later in accordance with the detail of determination by the route determination unit 72 (S14). When the packet is not acknowledged by the packet acknowledging unit 70 (N in S10), the subsequent steps are skipped so that the flow of the figure is terminated.

Figure 8:
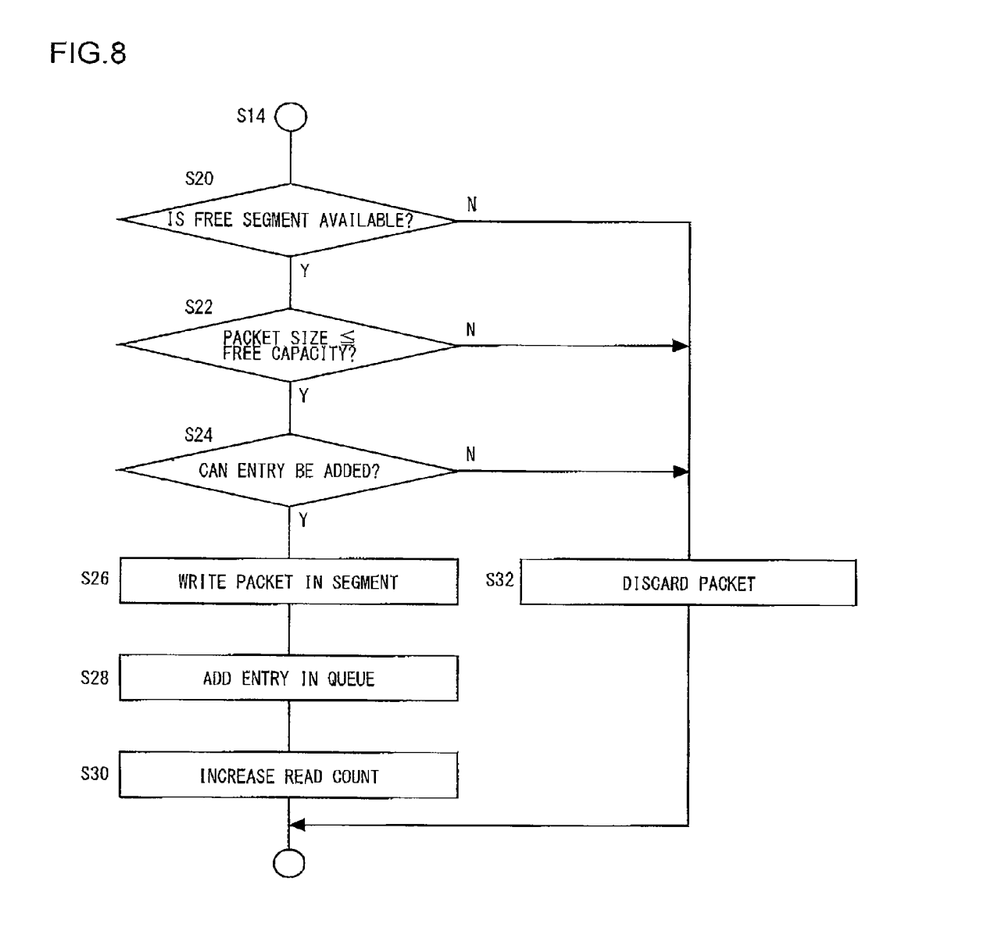
FIG. 8 is a flowchart showing S14 of FIG. 7 in detail.

FIG. 8 is a flowchart showing S14 of FIG. 7 in detail. The packet writing unit 74 refers to the free area information storage 36 so as to determine whether there is a free segment in the packet buffer 34 or whether the free capacity of the packet buffer 34 is as large as or larger than the packet size. When there is a free segment (Y in S20) and when the free capacity is equal to or more than the packet size (Y in S22), the packet writing unit 74 refers to the queue information storage 38 so as to determine whether a new entry can be added to the queue management table 60. When a new entry can be added (Y in S24), the packet data is stored in the free segment (S26) and the new entry is added to the queue management table 60 (S28). The read count in the read count storage 40 for the segment designated in the new entry in the queue management table 60 is increased by 1 (S30).

When there are no free segments in the packet buffer 34 (N in S20), when the free capacity is less than the packet size (N in S22), or when a new entry cannot be added to the queue (N in S24), the packet is discarded (S32) and the flow of the figure is terminated. In the case of a multicast packet or a broadcast packet, the determination of S24 is performed for each of multiple output ports 22 that the packet should be sent to (not shown in FIG. 8). When there are queues to which an entry can be added, steps S26-S30 are performed.

Figure 9:
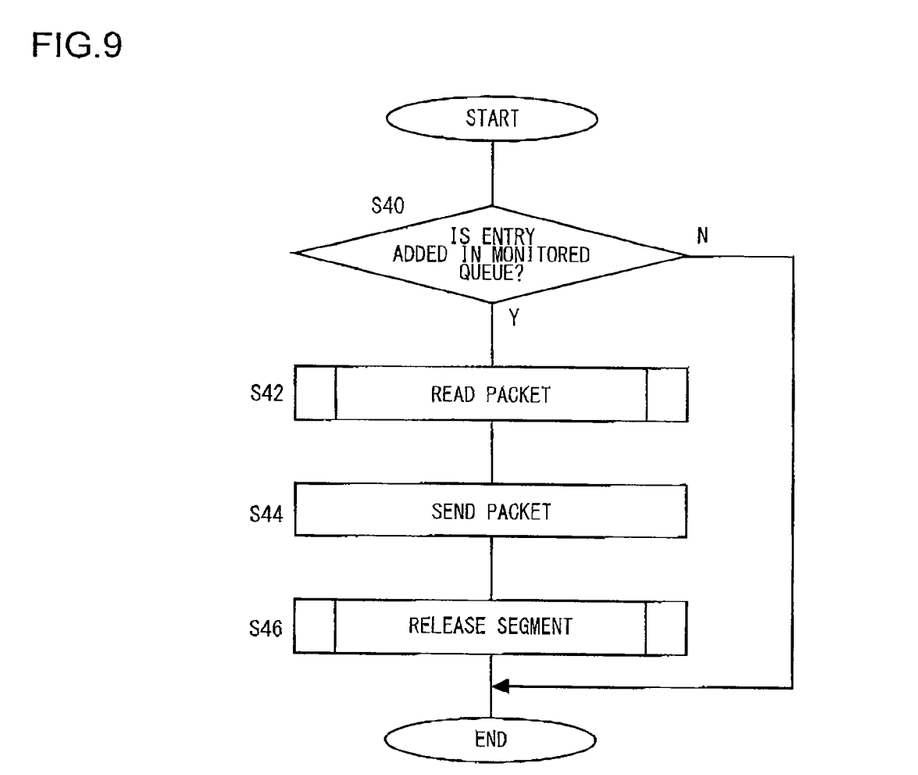
FIG. 9 is a flowchart showing the operation of the switch.

FIG. 9 is a flowchart showing the operation of the switch 10. The figure shows the operation of a single output processor 46. When the packet reading unit 80 detects that a new entry is added to the monitored queue in the queue management table 60 (Y in S40), the unit 80 performs a packet reading process described later (S42). The packet sending unit 82 sends the packet data read by the packet reading unit 80 to the communication node 12 via the corresponding output port 22 (S44). The segment releasing unit 84 performs a segment releasing process described later (S46). When there are no new entries in the monitored queue (N in S40), the following steps are skipped and the flow of the figure is terminated.

Figure 10:
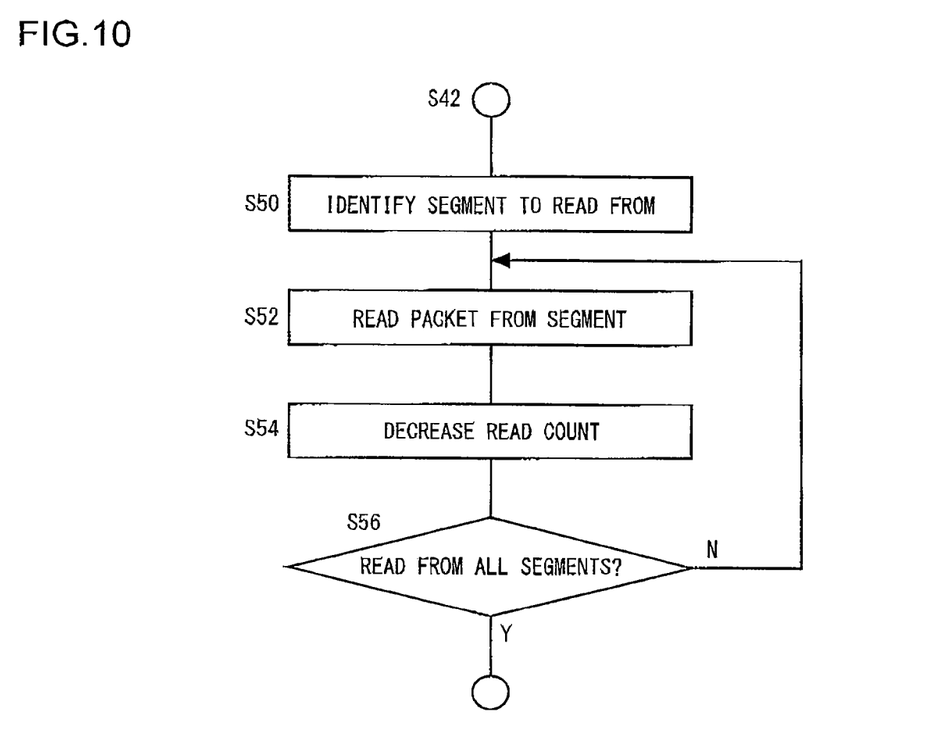
FIG. 10 is a flowchart showing S42 of FIG. 9 in detail.

FIG. 10 is a flowchart showing S42 of FIG. 9 in detail. The packet reading unit 80 refers to an entry in the queue management table 60 so as to identify one or more segments that the packet should be read from (S50). The unit 80 reads the packet data from the segments in the order designated by entries in the queue management table 60 (S52) and decreases the read count of the segment retained in the read count storage 40 by one (S54). When the packet data has been read from all of the segments designated by the entries in the queue management table 60 (Y in S56), the flow of the figure is terminated. When there are segments that the packet data is yet to be read from (N in S56), control is returned to S52.

Figure 11:
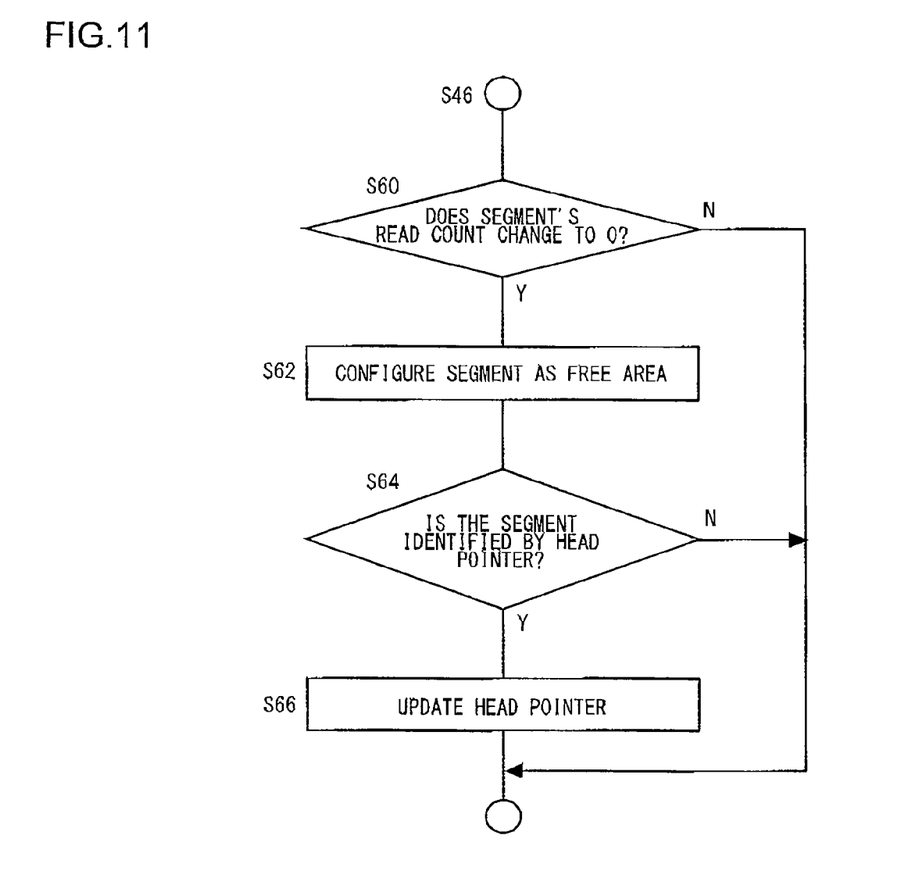
FIG. 11 is a flowchart showing S46 of FIG. 9 in detail.

FIG. 11 is a flowchart showing S46 of FIG. 9 in detail. The segment releasing unit 84 periodically refers to the read count of the segments retained in the read count storage 40 and identifies a segment for which the read count changes from 1 or more to 0 (hereinafter, referred to as "read completion segment"). When a read completion segment is detected (Y in S60), the segment releasing unit 84 designates the read completion segment into a free area by storing the associated segment number at the location indicated by the end pointer 56 in the free area information storage 36 (S62).

When the segment number of the read completion segment is also designated by the head pointer 52 in the free area information storage 36 (Y in S64), the segment releasing unit 84 updates the head pointer 52 so as to indicate a segment number next in the order of storage of packets designated in the free area information storage 36 (S66). When the segment number of the read completion segment is not designated by the head pointer 52 (N in 64), S66 is skipped. When a read completion segment is not detected (N in S60), the subsequent steps are skipped and the flow of the figure is terminated.

According to the switch 10 of this embodiment, a single segment can store multiple packets by managing an offset indicating where a free area of a segment starts and by storing a packet, starting at the location indicated by the offset. In this way, the entirety of the capacity of a segment can be efficiently used for storage of a packet so that efficient use of the memory is achieved. For example, given that the technology as proposed in this embodiment multiplies the use efficiency of a memory N times, the capacity of the memory that should be installed in the switch 10 is decreased to 1/N so that necessary hardware resources are reduced accordingly.

According to the switch 10, the number of times that packet data is scheduled to be read from each of multiple segments is maintained in the read count storage 40 in a centralized manner. This allows the multiple input processors 44 to operate in parallel and allows the multiple output processors 46 to operate in parallel. Even when multicast packets and broadcast packets that should be output from the multiple output ports 22, and unicast packets coexist, free segments can be set up in a timely manner, facilitating the re-use of segments.

Given above is an explanation of the present invention based on an embodiment. The embodiment is intended to be illustrative only and it will be obvious to those skilled in the art that various modifications to constituting elements and processes could be developed and that such modifications are also within the scope of the present invention.

In this embodiment, it is assumed that the input port 20 and the output port 22 are directly connected to the external communication node 12. The switch 10 may be configured otherwise. In one variation, input and output ports may be configured logically in the switch 10. More specifically, at least one of the input port 20 and the output port 20 may be connected to another communication related process in the switch 10. In other words, a packet may be subjected to another communication related process in the switch 10 before being relayed through the input port 20, the input processor 44, the output processor 46, and the output port 22.

Alternatively, another communication related process may be performed in the switch 10 after a packet is relayed through the input port 20, the input processor 44, the output processor 46, and the output port 22.

It will be appreciated by a skilled person that the functions that should be achieved by the constituting elements as described in the claims are achieved by the constituting elements indicated in the embodiment and the variations, either individually or in combination.

What is claimed is:

1. A communication controller comprising:
a memory including a plurality of segments for temporarily storing a packet to be relayed, using a segment of a fixed size as a unit of management of a storage area;
a packet acknowledging unit configured to receive a packet to be relayed from an external source;
a packet writing unit configured to refer to an offset, indicating a location in a segment where a free area starts, store a packet, starting at the location in the segment indicated by the offset, update the location of start indicated by the offset in accordance with the packet size, and store another packet, starting at the location of start in the segment thus updated; and
a packet sending unit configured to read the packet, starting at the location of start, read said other packet, starting at the updated location of start, and send the packets outside the communication controller;
a read count storage configured to store, in association with each of the plurality of segments, a total number of times that at least one packet stored in the respective segments should be read; and
a segment releasing unit, wherein, each time the packet writing unit stores the packet acknowledged by the packet acknowledging unit in a segment, the packet writing unit increments the total associated with the segment, the packet sending unit decrements the total associated with the segment each time the packet sending unit reads the packet stored in the segment, and the segment releasing unit configures a segment for which the read count reaches 0 as a new free area.

2. The communication controller according to claim 1, wherein, when the free capacity of a segment specified the offset exceeds the packet size, the packet writing unit stores the excess packet data in another segment and updates the location of start indicated by the offset to a location in said other segment where a free area that remains starts.

3. The communication controller according to claim 1 wherein, the packet writing unit stores a packet that should be sent via a plurality of output ports in a segment such that the packet writing unit increases the total associated with the segment by the number of output ports that the packet should be sent to, and the packet sending unit sends the packet from any of the plurality of output ports such that the packet sending unit reads the packet from the segment and successively decreases the total associated with the segment.

4. A communication controller comprising:
a memory including a plurality of segments for temporarily storing a packet to be relayed, using a segment of a fixed size as a unit of management of a storage area;
a packet acknowledging unit configured to receive a packet to be relayed from an external source;
a packet writing unit configured to refer to an offset, indicating a location in a segment where a free area starts, store a packet, starting at the location in the segment indicated by the offset, update the location of start indicated by the offset in accordance with the packet size, and store another packet, starting at the location of start in the segment thus updated;
a packet sending unit configured to read the packet, starting at the location of start, read said other packet, starting at the updated location of start, and send the packets outside the communication controllera read count storage configured to store, in association with each of the plurality of segments, a total number of times that each packet stored in the respective segments should be read;
a segment releasing unit, wherein, when the packet writing unit stores the packet acknowledged by the packet acknowledging unit in a segment, the packet writing unit increases the total associated with the segment, the packet sending unit decreases the total associated with the segment when the packet sending unit reads the packet stored in the segment, and the segment releasing unit configures a segment for which the read count reaches 0 as a new free area;
a free segment information storage configured to store information on a segment configured as a free area; and
a head pointer indicating information on a segment, of those segments configured as free areas, that should store a packet, and an end pointer indicating a location that should store information on a segment newly configured as a free area, wherein the packet writing unit stores the packet in the segment identified by the head pointer, and the segment releasing unit stores the information on the segment newly configured as a free area at the location indicated by the end pointer, and, when that segment is also identified by the head pointer, updates the head pointer to indicate information on another segment.

5. A communication control program embedded in a non-transitory computer readable recording medium and adapted to control a communication device provided with a memory including a plurality of segments for temporarily storing a packet to be relayed, using a segment of a fixed size as a unit of management of a storage area, the program comprising:
a packet acknowledging module configured to receive a packet to be relayed from an external source;
a packet writing module configured to refer to an offset, indicating a location in a segment where a free area starts, store a packet, starting at the location in the segment indicated by the offset, update the location of start indicated by the offset in accordance with the packet size, and store another packet, starting at the location of start in the segment thus updated; and
a packet sending module configured to read the packet, starting at the location of start, read said other packet, starting at the updated location of start, and send the packets outside the communication device,
wherein a read count storage configured to store, in association with each of the plurality of segments, a total number of times that at least one packet stored in the respective segments should be read; and
a segment releasing module, wherein, each time the packet writing module stores the packet acknowledged by the packet acknowledging module in a segment, the packet writing module increments the total associated with the segment, the packet sending module decrements the total associated with the segment each time the packet sending module reads the packet stored in the segment, and the segment releasing module configures a segment for which the read count reaches 0 as a new free area.

* * * * *